United States Patent
Kobayashi

[15] 3,665,653
[45] May 30, 1972

[54] FEED MECHANISM FOR MACHINE TOOL

[72] Inventor: Akiyoshi Kobayashi, Asahimachi, Japan

[73] Assignee: Toyoda Koki Kabushiki Kaisha, Asahimachi, Kariya, Aichi Prefecture, Japan

[22] Filed: Jan. 19, 1971

[21] Appl. No.: 107,639

[30] Foreign Application Priority Data

Jan. 22, 1970 Japan....................................45/6734

[52] U.S. Cl..........................................................51/165.81
[51] Int. Cl..........................................................B24b 49/00
[58] Field of Search............51/165 R, 165.77, 165.8, 165.81, 51/165.9

[56] References Cited

UNITED STATES PATENTS

| 1,584,339 | 5/1926 | Wernecke............................51/165.81 |
| 2,946,161 | 7/1960 | Schultze et al.........................51/165.8 |

FOREIGN PATENTS OR APPLICATIONS

| 702,366 | 1/1954 | Great Britain........................51/165.81 |
| 1,014,249 | 8/1952 | France...................................51/165.81 |

*Primary Examiner*—Lester M. Swingle
*Attorney*—Connolly & Hutz

[57] ABSTRACT

In the feed handle mechanism of a machine tool a handle is integrally fitted to a handle shaft. An operating member is rotatably and axially movably attached to the handle shaft. Clamping structure selectively secures the handle solidly to the operating member. A worm wheel is rotatably supported by the handle shaft, and a worm engaging the worm wheel is equipped at one end with an operator knob. Connecting structure connects the operating member to the worm wheel for fine feeding when the operating member is axially shifted in one direction. Dead stop structure is brought into play by shifting the operating member in the other axial direction to thereby control the rotation of the operating member. Switching between dead stop machining and fine feed machining is effected by axial shifting of the operating member.

7 Claims, 5 Drawing Figures

FEED MECHANISM FOR MACHINE TOOL

BACKGROUND OF THE INVENTION

With machine tools having conventional feed handle mechanisms it is impossible to accomplish both dead stop machining and fine feed machining. More specifically, dead stop machining is an operation in which the rotating end of the handle is restricted by a stop arrangement, and the workpiece is machined to a desired finished dimensions in one stroke of rotating the handle up to the position of the stop. On the other hand, with fine feeding machining, the grinding wheel is fed toward the workpiece by appropriate rotation of the handle, and after the workpiece has been machined close to the finished dimensions the fine feed acts to make a finishing touch of micron order on the workpiece. With fine feed machining, the forward end of the grinding wheel is not restricted. Thus there is a significant difference in operation between dead stop machining and fine feed machining. Conventional feed handle mechanisms only accomplish one or the other of these machinings. Obviously, a feed handle mechanism capable of performing both types of machining is in great demand.

SUMMARY OF THE INVENTION

The general object of the present invention is to provide a feed handle mechanism that performs both manual dead stop machining and manual fine feed machining.

Another object of the present invention is to provide simple, easy and highly reliable switching between manual dead stop machining and fine feed machining.

In accordance with the present invention a feed mechanism is provided for a machine tool. The mechanism comprises a handle with a handle shaft drivingly connected thereto. An operating member is rotatably and axially movably mounted about the handle shaft. The operating member is constructed and arranged so that it can be selectively located at two axial positions relative to the handle shaft. Clamping structure selectively secures the operating member to the handle for rotation therewith. Moreover, a worm wheel is rotatably mounted about the shaft, and a worm connected to a knob is in engagement with the worm wheel. Connecting structure drivingly connects the operating member with the worm wheel when the operating member is in one of its two axial positions. This connection provides the fine feed machining associated with the feed mechanism. Also, dead stop structure is provided for restricting the rotation of the handle shaft when the operating member is in the other of its two axial positions and the member is secured to the handle by the clamping structure. This relationship provides the dead stop machining associated with the present feed mechanism.

BRIEF DESCRIPTION OF THE DRAWING

Novel features and advantages of the present invention in addition to those mentioned above will become apparent to those skilled in the art from a reading of the following detailed description in conjunction with the accompanying drawing wherein.

DETAILED DESCRIPTION OF THE INVENTION

Figure 1:
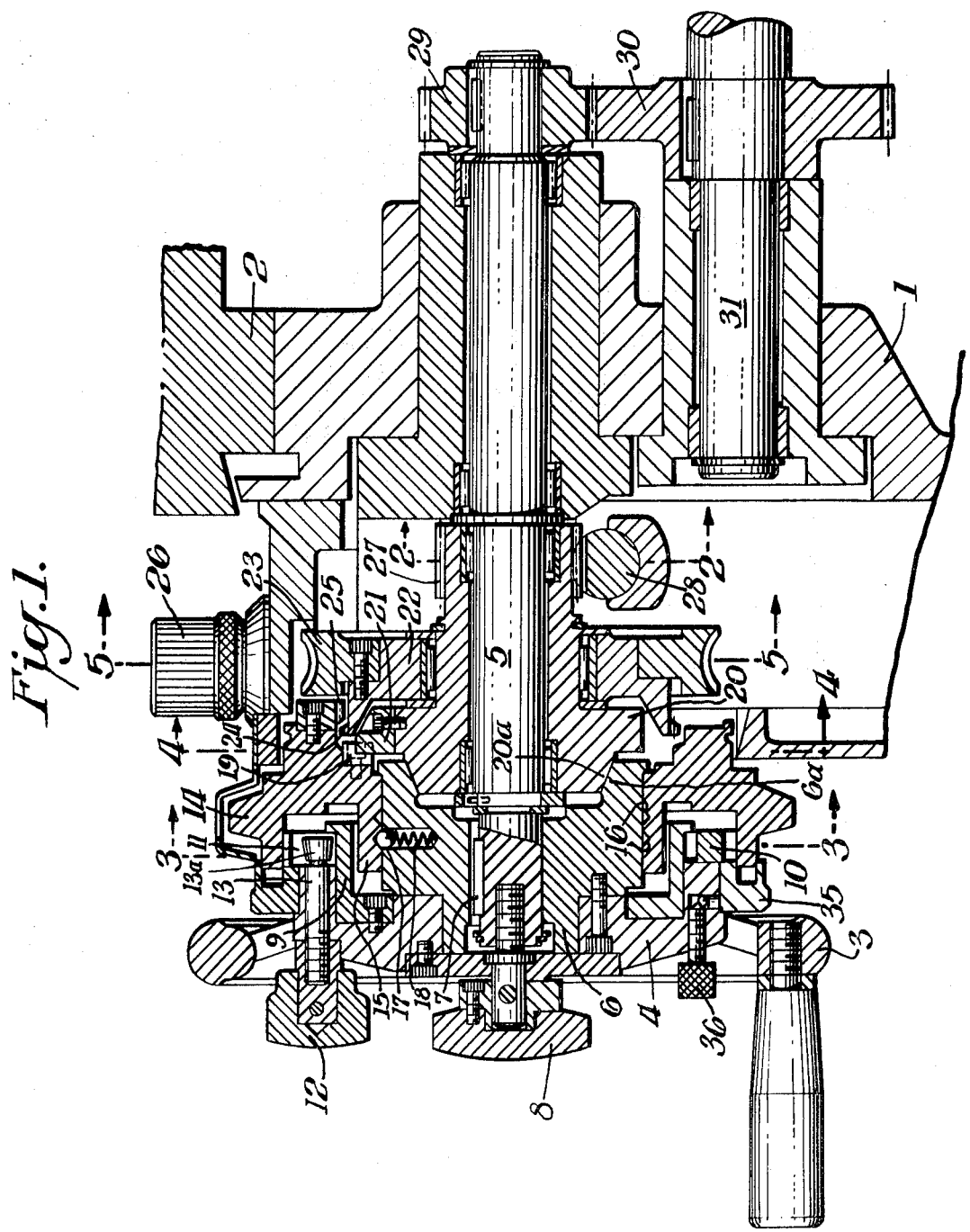
FIG. 1 is a longitudinal sectional view of a feed mechanism according to the present invention.
Figure 2:
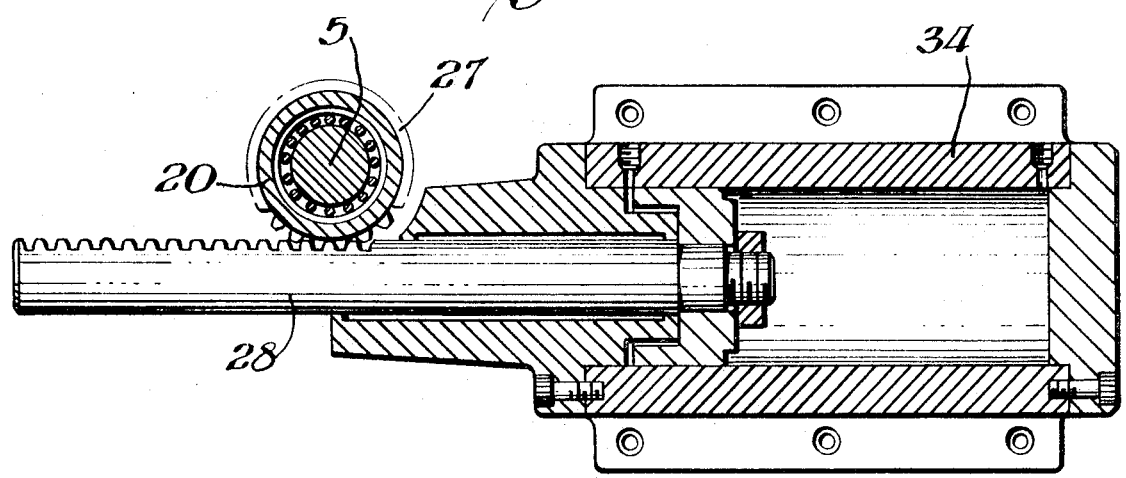
FIG. 2 is a sectional view along the line 2—2 of FIG. 1.

Referring in more particularity to the drawing, FIG. 1 illustrates a bed 1 and a sliding table 2 arranged to support a workpiece (not shown). The table is arranged for free sliding movement relative to the bed 1. A manual feed handle 3 is fitted onto the front of the bed 1. A movable clutch 6 for manual-automatic switching is secured to the inside periphery of the boss 4 of the handle 3. A key 7 is provided for connecting the movable clutch 6 to a first shaft 5 rotatably received in the bed 1. The movable clutch 6 and handle 3 are arranged for axial shifting along the shaft 5 by operation of a manual-automatic switch knob 8.

A stationary clutch 20 opposite the movable clutch 6 is freely rotatably fitted to the shaft 5. The stationary clutch 20 and the movable clutch 6 are brought into solid contact with each other by frictional tapered contact surfaces 6a, 20a when the movable clutch 6 is moved to the right, as viewed in FIG. 1, by the switch knob 8. A pinion 27 is located at the rear of the stationary clutch 20. The pinion 27 meshes with a rack piston 28 that moves within a cylinder 34 serving as an automatic feed mechanism. Thus, when fluid pressure is supplied to the cylinder 34, the stationary clutch 20 is rotated by the rack piston 28 and the pinion 27. This rotation is transmitted to the shaft 5 through rotation of the movable clutch 6 via the frictional contact surfaces 20a, 6a. This rotation is further transmitted from a fixed gear 29 at the end of the shaft 5 to a gear 30 fixed to a second shaft 31 supported in parallel relationship relative to the first shaft 5. This rotation ultimately transmitted to the second shaft 31 causes a feed screw (not shown) to turn and feed a grinder table, as well known in the art.

Figure 3:
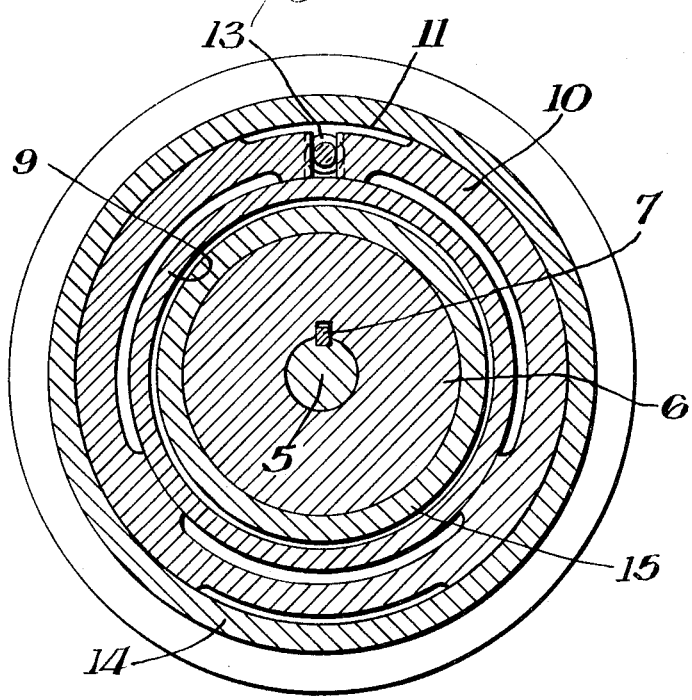
FIG. 3 is a sectional view along the line 3—3 of FIG. 1.

A trough-like sleeve 9 is secured to the inside periphery of the boss 4 of the handle 3. As shown best in FIG. 3 an expandable ring 10 is located directly adjacent the outer periphery of the sleeve 9. The ring 10 is provided with a tapered notch 11 at the periphery thereof, and notch 11 is adapted to be engaged by the tapered head 13a at one end of a clamping member 13. The clamping member 13 is slidably received in the boss 4 of the handle 3, as shown best in FIG. 1. The other end of the clamping member 13 has a threaded portion in engagement with a switch knob 12. Axial shifting of the tapered head 13a through operation of the switch knob 12 causes the ring 10 to expand circumferentially.

An operating member 14 is fitted on the outside periphery of the movable clutch 6 for both rotatable and axial movement relative to the movable clutch. This operating member 14 is manually operated through the opening of the cover. A concave groove 16 in two longitudinal steps is provided on the fitting surface of the fixture portion 15 of the operating member 14. A stop ball 17 pressed outwardly by a spring 18 fits into the concave groove 16 thereby restricting axial movement of the operating member 14 relative to the movable clutch 6. The periphery of the ring 10 engages the top flange of the operating member 14, as shown best in FIG. 3. Accordingly, operation of the switch knob 12 causes an integrated rotation or separate rotations of the operating member 14 and the sleeve 9 through the ring 10. Integrated rotation occurs when the ring is expanded circumferentially while separate rotation occurs when the ring is in its relaxed unexpanded position.

Figure 4:
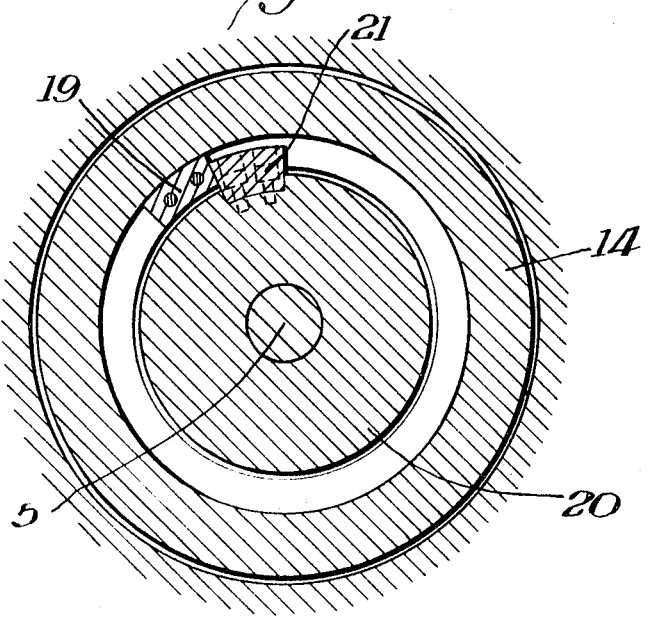
FIG. 4 is a sectional view along the line 4—4 of FIG. 1.

The operation member 14 carries a stopper 19 and a mesh gear 25. The stopper 19 cooperates with a stopper 21 which projects from the outside of the stationary clutch 20, as best shown in FIG. 4. A mesh gear 24 projects from a fastening member 22 rotatably fitted on the outside of the stationary clutch 20. As shown best in FIG. 1 the mesh gears 24, 25 face one another. These gears are disengaged when the operating member 14 is positioned to the right of the movable clutch 6, as shown in FIG. 1. On the other hand, the gears 24, 25 mesh with one another when the operating member 14 is positioned to the left relative to the movable clutch 6. The stop ball 17 and the two-step concave grooves 16 restrict the switching position of the operating member 14, as explained above.

Figure 5:
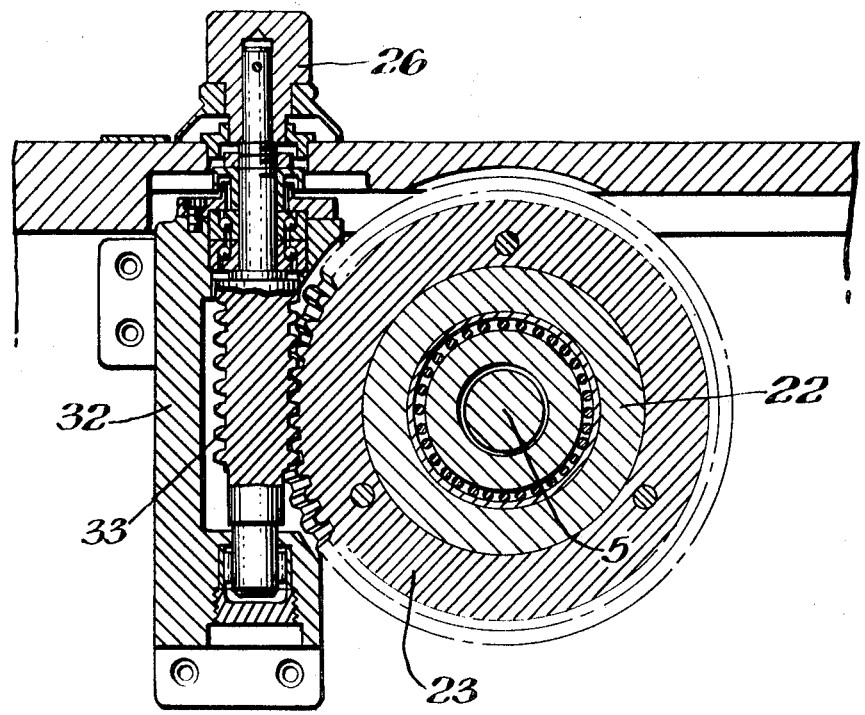
FIG. 5 is a sectional view along the line 5—5 of FIG. 1.

A scale ring 35 is rotatably fitted on the outside of the boss 4 of the handle 3. A knob 36 is provided for locking the scale ring 35 to the handle 3. Moreover, the fastening member 22 has a worm wheel 23 integrally fastened thereto. As shown best in FIG. 5 the worm wheel 23 meshes with a worm 33 rotatably mounted to a bearing 32. A knob 26 is secured to the worm 33 for fine feeding operation. Rotation of the knob 26 causes a very slight rotation of the worm wheel 23 via the worm 33. Ultimately, rotation of the worm wheel 23 is transmitted to the shaft 31, as explained more fully below. This provides the manual fine feeding associated with the present device.

The operation of the mechanism of the present invention is as follows. First, before either manual dead stop machining or manual fine feed machining the automatic-switch knob 8 is actuated to disengage the movable clutch 6 from the stationary clutch 20. FIG. 1 illustrates the location of the various components prior to disengagement of the movable and stationary clutches. Next, for manual dead stop machining, the operating member 14 is shifted to its right-hand position, as indicated in FIG. 1. The gears 24, 25 are in their disengaged state, and the stopper 19 is located at a position which permits engagement with the stopper 21 on the stationary clutch 20. The operating member 14 is then turned to give the rotating angle necessary for the desired dead stop machining. This sets the location of the stopper 19 and provides a gap between the stoppers 19 and 21 equivalent to the necessary rotating angle for the desired amount of dead stop machining. Next, the switch knob 12 is operated to expand the ring 10 to thereby integrate the sleeve 9 and the operating member 14. When the handle 3 is turned rotation thereof is transmitted via the movable clutch 6 and the key 7 to the first shaft 5. Rotation of the shaft 5 via the gears 29, 30 causes the second shaft 31 to rotate which in turn operates the feed screw (not shown) to thereby effect the infeed of the grinder table. The operating member 14 turns in the same direction as the handle 3 and ultimately the stopper 19 engages the stopper 21 on the stationary clutch 20. This engagement prevents further infeed of the grinder table. Rotation of the stationary clutch 20 is prevented by the cylinder 34 and piston 28 in engagement with pinion 27.

For manual fine feed machining, the switch knob 12 is manipulated so as to contract the ring 10 thereby disconnecting the operating member 14 from the sleeve 9. The operating member 14 is then shifted to its left-hand position from the right-hand position shown in FIG. 1. This movement positions the stopper 19 out of contact with the stopper 21 associated with the stationary clutch 20. Also, such movement of the operating member 14 causes the gears 24, 25 to mesh with one another. When the handle 3 is manipulated with the components with this relationship, the rotation of the handle is transmitted via the movable clutch 6, shaft 5 and gears 29, 30 to the second shaft 31. The second shaft 31 drives the feed screw (not shown) thereby causing infeed of the grinder table. Ultimately, when the grinder table moves forward to finish the machining operation close to the desired exact dimensions the handle 3 can no longer be used to make a fine feed of micron order. Then, the switch knob 12 is manipulated to expand the ring 10 outwardly thereby uniting the sleeve 9 and the operating member 14. After this condition is set, the fine feed knob 26 is turned, and this rotation is transmitted with significant reduction through the worm 33, worm wheel 23 and gears 24, 25 to the operating member 14. Rotation of the operating member is transmitted via the ring 10, sleeve 9, handle 3 and movable clutch 6 to the first shaft 5. Rotation of the first shaft 5 is transmitted via the gears 29, 30 and second shaft 31 to the feed screw (not shown) to thereby bring about a micron-fine feed of the grinder table.

Thus, the present invention provides a universal feed handle mechanism which is capable of making both manual dead stop machining and fine feed machining. The switching between manual dead stop and fine machining is simply and easily effective in a highly reliable manner through manipulation of the operating member 14.

What is claimed is:

1. A feed mechanism for a machine tool comprising a handle, a shaft drivingly connected to the handle, an operating member rotatably and axially movably mounted about the shaft, the operating member being selectively located in two axial positions relative to the shaft, clamping means for selectively securing the operating member to the handle for rotation therewith, a worm wheel rotatably mounted about the shaft, a worm in engagement with the worm wheel, a knob connected to drive the worm, connecting means for drivingly connecting the operating member with the worm wheel when the operating member is in one of its two axial positions, and dead stop means for restricting the rotation of the shaft when the operating member is in the other of its two axial positions and secured to the handle by the clamping means whereby dead stop machining and fine feed machining are selectively performed.

2. A feed mechanism as in claim 1 wherein the clamping means comprises an expandable ring rotatably received between the operating member and the handle, the ring having a tapered notch at the periphery thereof, a clamp member slidably received in the handle and having at one end thereof a tapered head associated with the tapered notch at the periphery of the ring, a threaded portion at the other end of the clamp member, and a switch knob in threaded engagement with the threaded portion of the clamp member whereby the operating member is connected for movement with the handle when the switch knob is manipulated so as to expand the ring into engagement with both the operating member and the handle.

3. A feed mechanism as in claim 1 wherein the connecting means comprises a first mesh gear fixed to the worm wheel and a second mesh gear fixed to the operating member, the second mesh gear being adapted to engage the first mesh gear when the operating member is in one of its two axial positions.

4. A feed mechanism for a machine tool comprising a bed, a handle shaft rotatably mounted to the bed, a movable clutch slidably but non-rotatably mounted to the handle shaft and having a tapered surface at one end thereof, a handle secured to the movable clutch, a stationary clutch rotatably mounted to the handle shaft and having a tapered surface at one end thereof associated with the tapered surface of the movable clutch, a gear at the other end of the stationary clutch, means for shifting the movable clutch axially relative to the handle shaft for selective engagement with the stationary clutch at the tapered surfaces, a hydraulic cylinder having a piston rod with a rack in engagement with the gear of the stationary clutch, a worm wheel rotatably mounted on the stationary clutch, a worm in engagement with the worm wheel, a knob connected to drive the worm, an operating member rotatably and axially movably mounted on the handle shaft, the operating member being selectively located in two axial positions relative to the handle shaft, clamping means for selectively securing the operating member to the handle for rotation therewith, connecting means for drivingly connecting the operating member with the worm wheel when the operating member is in one of its two axial positions, and dead stop means for restricting the rotation of the handle shaft when the operating member is in the other of its two axial positions and secured to the handle by the clamping means whereby dead stop machining and fine feed machining are selectively performed.

5. A feed mechanism as in claim 4 wherein the clamping means comprises an expandable ring rotatably received between the operating member and the handle, the ring having a tapered notch at the periphery thereof, a clamp member slidably received in the handle and having at one end thereof a tapered head associated with the tapered notch at the periphery of the ring, a threaded portion at the other end of the clamp member, and a switch knob in threaded engagement with the threaded portion of the clamp member whereby the operating member is connected for movement with the handle when the switch knob is manipulated so as to expand the ring into engagement with both the operating member and the handle.

6. A feed mechanism as in claim 4 wherein the connecting means comprises a first mesh gear fixed to the worm wheel and a second mesh gear fixed to the operating member, the second mesh gear being adapted to engage the first mesh gear when the operating member is in one of its two axial positions.

7. A feed mechanism as in claim 4 wherein the dead stop means comprises a first stop secured to the stationary clutch, and a second stop secured to the operating member and adapted for engagement with the first stop during rotation thereof when the operating member is in the other of its two axial positions.

* * * * *